UNITED STATES PATENT OFFICE.

MAX ENGELS, OF WESTEND, NEAR BERLIN, GERMANY.

MUFFLE FOR THE DISTILLATION OF ZINC.

1,136,519.  Specification of Letters Patent.  Patented Apr. 20, 1915.

No Drawing.  Application filed February 11, 1915.  Serial No. 7,653.

*To all whom it may concern:*

Be it known that I, Dr. MAX ENGELS, a citizen of the German Empire, residing at Westend, near Berlin, Germany, have invented certain new and useful Improvements in Muffles for the Distillation of Zinc, of which the following is a specification.

This invention relates to a muffle for the distillation of zinc which is at the same time comparatively cheap in its manufacture and durable in use.

To this end the new muffle consists of a mixture of clay and fire-proof material containing a small proportion of zirconia.

Good results have been obtained with muffles consisting of about 33 parts in weight of clay, 62 parts of fire-clay and 5 parts of zirconia. Such muffles are remarkably more durable than the usual muffles consisting of about 33 parts of clay and 67 parts of fire-clay. It is however understood that increase in durability over the usual muffles consisting of clay and fire-clay alone is confined to a comparatively small proportion in zirconia contained in the muffle material. If larger proportions of fire-clay in the usual muffle composition are substituted by zirconia, the increase in durability ceases and deterioration sets in. The contents in zirconia should not exceed 10 per cent. However it is not necessary to strictly adhere to a proportion of 5% in zirconia. Good results are still obtained with smaller contents in zirconia and it has been found that even 1% in zirconia gives a perceivable improvement of the muffle.

What I claim is:—

1. A muffle for the distillation of zinc consisting of clay and fire-proof material containing from 1 to 10% of the total mass of the muffle in zirconia.

2. A muffle for the distillation of zinc consisting of about 33⅓% of clay, 1 to 10% of zirconia and with the remainder substantially of fire-clay.

In testimony whereof I affix my signature in presence of two witnesses.

DR. MAX ENGELS.

Witnesses:
 WOLDEMAR HAUPT,
 HENRY HASPER.